United States Patent [19]

Porter et al.

[11] Patent Number: 4,831,622
[45] Date of Patent: May 16, 1989

[54] APPARATUS FOR FORCING A RELOAD FROM MAIN MEMORY UPON CACHE MEMORY ERROR

[75] Inventors: Marion G. Porter, Phoenix; Marvin K. Webster; Ronald E. Lange, both of Glendale, all of Ariz.

[73] Assignee: Honeywell Bull Inc., Phoenix, Ariz.

[21] Appl. No.: 136,301

[22] Filed: Dec. 22, 1987

[51] Int. Cl.$^4$ ............................................. G06F 11/10
[52] U.S. Cl. ...................................... 371/10; 364/200; 371/51
[58] Field of Search ...................... 371/38, 51, 10, 13; 364/200, 900

[56] References Cited

U.S. PATENT DOCUMENTS

| | | | |
|---|---|---|---|
| 4,483,003 | 11/1984 | Beal | 371/51 |
| 4,641,305 | 2/1987 | Joyce et al. | 371/13 |
| 4,761,783 | 8/1988 | Christensen et al. | 371/38 |

*Primary Examiner*—Charles E. Atkinson
*Attorney, Agent, or Firm*—J. H. Phillips; J. S. Solakain

[57] ABSTRACT

In a data processing system, there is included a central processing unit (CPU) and a main memory for storing computer words, the CPU including a cache unit. In operation, the CPU requests that a computer word be fetched, the computer word to be fetched being identified by a real address location corresponding to a location where the predetermined computer word is stored in main memory. The CPU request to fetch the computer word is coupled through the cache unit such that the cache unit determines whether the computer word is stored within the cache unit. The cache unit comprises a cache for storing predetermined ones of the compter words. A directory is included for storing partial real address information to a corresponding computer word stored in the cache. A detecting element, operatively connected to the cache and to the directory, determines when a hit occurs without any errors. Control logic, operatively connected to the detecting element, makes available to the CPU the requested computer word from the cache or the main memory when an error is detected as a result of attempting to obtain the computer word from the cache.

5 Claims, 2 Drawing Sheets

| BIT 0 1 2 3 4 5 6 7 8 9 10 11 12 | 13 14 15 16 17 18 19 20 21 22 23 24 | 25 26 27 |
|---|---|---|
| ←——— DIRECTORY WORD ———→ | ←——— DIRECTORY ADDRESS ———→ | WORD OF BLOCK |

FIG. 2

| COMPARATOR OUTPUTS | | DIRECTORY PARITY RESULTS | | CACHE PARITY RESULTS | | RESULTS (OPERATION PERFORMED BY CACHE CONTROL LOGIC |
|---|---|---|---|---|---|---|
| $A_A$ | $A_B$ | $B_A$ | $B_B$ | $C_A$ | $C_B$ | |
| 0 | 0 | – | – | – | – | MISS-FETCH FROM MAIN MEMORY |
| 1 | 0 | 0 | – | 0 | – | DATA IS IN OUTPUT REGISTER A |
| 0 | 1 | – | 0 | – | 0 | DATA IS IN OUTPUT REGISTER B |
| 1 | – | 1 | – | 0 | – | MISS |
| – | 1 | – | 1 | – | 0 | MISS |
| 1 | – | 0 | – | 1 | – | MISS |
| – | 1 | – | 0 | – | 1 | MISS |
| 1 | 1 | – | – | – | – | MISS |

FIG. 3

APPARATUS FOR FORCING A RELOAD FROM MAIN MEMORY UPON CACHE MEMORY ERROR

BACKGROUND OF THE INVENTION

This invention relates to a computer system having a central processing unit which includes a cache memory unit, and more particularly, to an apparatus which forces a read from a main memory when an error is detected during a read from the cache memory.

In the art relating to computer systems, a significant limiting factor in the performance of large computers is the access time of a central processor unit (CPU) to a main memory. The access time to the main memory in such computer systems is due in large part to arbitration, bus, and controller delays in the memory access path. On the other hand, high speed random access memories (RAMs) provide a memory with a much faster access time. The effective access time of the memory of a large computer system may be improved, while the main memory continues to be of the relatively slow access type, by the addition of a smaller random access memory that is located close to and used exclusively by the CPU. That small random access memory generally has a faster access time than the main memory and is referred to in the art as a cache memory.

The conventional structure of a cache includes a content addressable memory and a data memory. The content addressable memory is used to relate the address supplied by the processor with a location in the data memory containing the value of the word. When the CPU makes a memory request, the address is presented to the content addressable memory, also referred to herein as a directory. If the content of that address is present in the cache, a "hit" occurs indicating that this data is available and can be fetched from cache. If the content addressable memory does not indicate that the requested address is present, a "miss" occurs and the data must then be fetched from the main memory in the usual way. As the data is read from the main memory, it is also loaded into the cache and the corresponding content addressable memory updated.

Generally, reads from memory including main memory or cache memory utilize some form of checking in order to verify the data is error free; namely, parity checking. If a parity error is detected in a store-into system, the present day systems generate an error signal and abort the system because there is no way to recover, i.e., the data in the cache is the only up to date copy since the data is stored in cache until the data has to be transferred into main memory (swapped out). If a parity error is detected in a store-thru system, the present day systems generate an error signal and abort although the data is correct and available in main memory.

In the computer system which utilizes the present invention, data is stored into both cache and main memory (which is also known as a store-through approach). Therefore, when there is a parity error detected on the information read from the directory or from the cache memory, the apparatus of the present invention forces a "miss" result thereby causing the CPU to refetch the data from main memory.

In the system which utilizes the present invention, parity checking is utilized rather than error detection and correction (EDAC). The time required to do the parity checking versus error detecting and correcting is substantially less such that a substantial time advantage is achieved. Because of the high reliability of today's components, the number of times a refetch is performed is relatively low. Further, the preferred embodiment of the system which utilizes the present invention fetches the information from the directory and the cache memory in parallel. These combined factors favor parity checking to yield the optimum time advantage without affecting system operation or system reliability.

SUMMARY OF THE INVENTION

Therefore, there is provided in the present invention, an apparatus for forcing a reload from a main memory upon detection of a cache memory error. In a data processing system, there is a central processing unit (CPU) and a main memory for storing computer words, the CPU including a cache unit. In operation, the CPU requests that a computer word be fetched, the computer word to be fetched being indentified by a read address location corresponding to a location where the predetermined computer word is stored in main memory. The CPU request to fetch the computer word is coupled through the cache unit such that the cache unit determines whether the computer word is stored within the cache unit. The cache unit comprises a cache for storing predetermined computer words. A directory is included for storing partial real address information to a corresponding computer word stored in the cache. A detecting element, operatively connected to the cache and to the directory, determines when a hit occurs without any errors. Control logic, operatively connected to the detecting element, makes available to the CPU the requested computer word from the cache or the main memory when an error is detected as a result of attempting to obtain the computer word from the cache.

Accordingly, it is an object of the present invention to provide an apparatus for forcing a reload from a main memory upon detection of a cache memory error.

It is another object of the present invention to provide an apparatus for forcing a reload from a main memory upon detection of an error in reading information from a direction memory.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 2 shows a bit breakout and usage of a real address word of the preferred embodiment; and FIG. 3 shows a truth table which describes the operation of a cache control logic of the preferred embodiment of the present invention.

DETAILED DESCRIPTION

Figure 1:
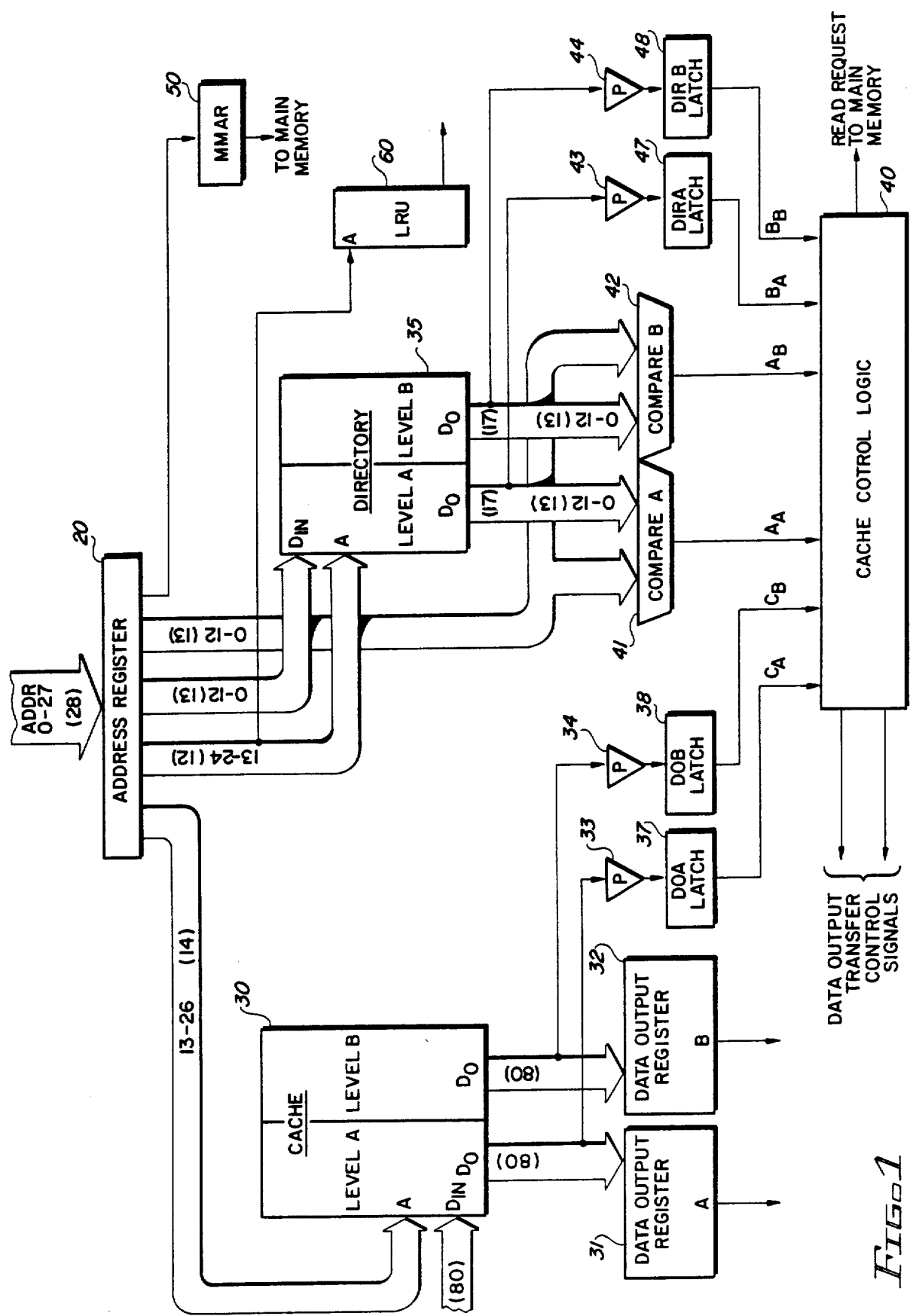
FIG. 1 shows a functional block diagram of the preferred embodiment of the present invention.

In most central processing units (CPU), a predefined sequence is followed in the execution of instructions. These sequences generally include fetching of an instruction which has an operation code and an operand address. The operand address portion may vary in its definition/structure depending on the type of instruction as defined by the operation code, but usually the operand field is an address in some form which indicates the location of the data which is to be involved in the operation. Subsequent steps of the sequence include decoding the operation code and generating the real address of the operand. The generation of the real address includes performing a variety of predefined operations on the index register contents, base register contents, operand address information from the instruction word, indirect addressing as indicated by predefined bits in the instruction word, including tag bits, tally bits, . . . , the generation depending on the design features of the CPU. Once the real address of the operand is generated, it is temporarily stored in a register and the operand can then be fetched from a main memory unit (or more simply, main memory). The description of the operation of the preferred embodiment of the present invention starts at the point in the sequence in which the real address has been generated.

Referring to FIG. 1, there is shown a functional block diagram of the preferred embodiment of the present invention.

The real address of the computer word to be fetched is stored in address register 20. In the preferred embodiment of the present invention, the address (ADDR) is a 28 bit word for addressing a main memory (not shown) of $2^{28}$ in size. In a CPU having a cache memory such as is included in the CPU of the preferred embodiment, before the computer word (the computer word or word to be fetched can be a data word or an instruction word) is fetched from main memory, a look-up operation is performed internal to the CPU to determine if the computer word to be fetched is stored internal to the cache 30. If the desired computer word is not stored in the cache 30, or if there has been an error detected upon reading the cache 30, a cache control logic 40 will transmit a read request control signal to main memory along with the desired real address of the computer word, the address being transferred to the main memory via a main memory address register (MMAR) 50.

Referring to FIG. 2, there is shown a bit break out and usage of the real address word of the preferred embodiment. Bits 0–12 of the real address word form the directory word, i.e., that part of the real address word which is actually stored in a directory 35. Bits 13–24 of the real address word form the directory address, i.e., the portion of the real address word which is used to address a specific location of the directory 35. Bits 25–27 identify the word within a block. A block of the preferred embodiment is a block of eight words. A word in the preferred embodiment is a 40 bit word, i.e., 36 bits of information and four parity bits. Fetches to main memory (not shown) result in a read of 80 bits, i.e., a double word read. As will be described hereinunder, the cache is structured in a fashion to accommodate double word reads (and writes). Thus, the three bits, bits 25, 26, 27 address the word (or specify the word) within the eight word block.

Referring back to FIG. 1, the cache 30 of the preferred embodiment of the present invention includes two halves, level A and level B. The level A of cache 30 in the preferred embodiment of the present invention consists of a 16K by 80-bit cache. Similarly, level B is also a 16K by 80-bit cache. When a block write operation is to be performed from memory, data is stored in either level A or level B of the cache 30 as determined by a least recently used algorithm in conjunction with a least recently used memory 60. The information (i.e., the computer word) stored in cache 30 in level A or level B is four 40-bit double words (or 80 bits) of information, which is information transferred from main memory (not shown) to the CPU as a result of reading (or fetching) main memory, the computer word being either an instruction word or a data word. The information is stored in a location of cache 30 defined by the 14 bits, bits 13–26, from address register 20. During the same block write cycle of the information, 13 bits of information is stored in the directory 35, the 13 bits of information being the directory word, bits 0–12, from address register 20. The directory word stored in the directory 35 is at a location defined by the 12 bits, bits 13–24 from address register 20. The information is stored in the directory 35 in either level A or level B corresponding to the level A or level B of the cache 30, and is controlled by the least recently used algorithm and the least recently used memory 60. In the preferred embodiment of the present invention, the least recently used memory 60 is a 4K by 1-bit memory. Level A of the directory 35 in the preferred embodiment of the present invention is a 4K by 17-bit memory. Similarly, level B is also a 4K by 17-bit memory. Thus, it can be seen that the directory stores a value which defines an associative memory of the real address (ADDR). The remaining five bits stored in the directory 35 include two parity bits, one full/empty indicator bit, and a patrol full indicator bit, which is used internally by the CPU/cache unit and will not be described herein since it has no bearing on an understanding of the present invention.

The operation of the preferred embodiment of the present invention will now be described in conjunction with a read operation. Still referring to FIG. 1, the real address (ADDR) is stored in the address register 20. Before a read request to main memory is performed, the directory 35, levels A and B are read to determine if the desired computer word is stored in cache 30. Simultaneous reads of Level A and Level B of the cache 30 are performed, the address of cache (i.e., the location within the cache) being indicated by the 14 bits (bits 13–26) of ADDR. These 14 bits specify the location of the 16K bit cache in which the desired computer word corresponding to the real address ADDR might be stored. As a result of the read operation of cache 30, an 80-bit word, the Level A portion of cache 30, is outputted and stored in a data output register A (DORA) 31, and an 80-bit word read from the Level B portion of cache 30 is stored in a corresponding data output register B (DORB) 32, each data output register having 80 bits to accommodate the double word read of the preferred embodiment.

The data words read from the Level A and Level B portions of the cache 30 are coupled to corresponding parity check logic 33, 34, where a parity check is performed, the results of the parity check operation being stored in a corresponding parity results latch, DOA latch 37, and DOB latch 38, respectively. The results stored in the DOA latch 37 and the DOB latch 38 are coupled to the cache control logic 40, where these results are utilized in conjunction with other inputs to determine if the desired computer word is stored in cache or whether a read to main memory operation is to be performed, this determination to be explained further hereinunder in conjunctin with describing the operation of the cache control logic 40. It will be understood by those skilled in the art that there exists in the art many types of error checking and variations of parity checking; the type and operation of the error checking will not be discussed further since it will not add to understanding the present invention.

Simultaneously with the read of the cache 30, a read of the directory 35 is performed. Both Level A and Level B of the directory 35 is read, the location of the directory which is read being specified by the 12 bits of the real address (bits 13-24 of ADDR) and which is stored in address register 20. Bits 0-12 of the data which is read from Level A is coupled to a first comparator (COMPARE A) 41 and bits 0-12 of the data read from Level B is coupled to a second comparator (COMPARE B) 42, the output of the first and second comparator being coupled to the cache control logic 40. Also coupled to a second input of the first and second comparator 41, 42 are bits 0-12 of the real address (ADDR) from the address register 20. In parallel with the compare operation, the full 17 bits of the information read from Level A and Level B of the directory 35 are coupled to a corresponding parity check logic 43, 44. The results of the parity check operation are stored in a corresponding parity results latch DIRA latch 47 and DIRB latch 48, respectively. The results stored in DIRA latch 47 and DIRB latch 48 are coupled to the cache control logic 40.

Referring to FIG. 3, there is shown a truth table which describes the operation of the cache control logic 40. In the truth table, the outputs of the first and second comparator 41, 42 are denoted as $A_A$ and $A_B$, respectively, the subscript referring to the Level A or Level B portion of the associated data from the directory or the cache. The parity results resulting from the read of the information from the directory 35 are stored in DIRA latch 47 and DIRB latch 48, corresponding to Level A and Level B of directory 35, respectively. The output signals from the parity results latch 47, 48 are denoted as $B_A$ and $B_B$, respectively. Similarly, the output from Level A and Level B of cache 30 have their parity results stored in parity results latch DOA latch 37 and DOB latch 38, respectively. The parity signals coupled from the cache parity results latch are denoted as $C_A$ and $C_B$, respectively.

When the compare output from the first comparator, COMPARE A 41 is a logic zero, shown as a 0 in the truth table of FIG. 3, the logic zero is meant to signify that no compare results were obtained on the 13-bit data read from Level A of directory 35 when compared to the 13 bits of the real address ADDR from address register 20. Similarly, when the output of the second comparator COMPARE B 42 is a logic zero, the indication is that no compare resulted as a result of the read operation from the Level B portion of the directory 35. In such a case, the desired data as specified by the real address ADDR stored in address register 20 is not currently stored in either Level A or Level B of the cache, requiring the cache control logic 40 to generate and output a read request control signal to the main memory (not shown). In conjunction with this control signal, the real address desired to be read from main memory is coupled to the main memory (not shown) from the main memory address register 50. (The dashes in the truth table of FIG. 3 essentially signify a "don't care" condition.)

When a compare output from either COMPARE A 41 or COMPARE B 42 is a logic 1, the indication is that the desired data is stored in the corresponding level of the cache 30. If the signal $A_A$ is a logic 1 (the results of COMPARE A 41 is a logic 1,) this signifies that the data is stored in Level A of the cache. Of significance in this particular case are the directory parity results and the cache parity results for the corresponding level, i.e., signal $B_A$ and $C_A$. If the parity results of the corresponding level are a logic 0 (indicating no parity error) then the desired data is stored in the data output register A 31 and the cache control logic 40 generates the necessary data output transfer control signals such that the data stored in data output register A 31 is transferred to the appropriate predetermined portions of the CPU in order that the sequence of the CPU may continue permitting the CPU to perform the desired operation. If the comparator output result $A_B$ is a logic 1, signifying that the desired data is stored in Level B of the cache 30 and no parity error results for the corresponding level, i.e., the directory parity results and the cache parity results $B_B$, $C_B$ are both 0, then the desired data is stored in data output register B and the cache control logic 40 generates the data output transfer control signals such that the data stored in data output register B 32 may be transferred to the appropriate predetermined portions of the CPU.

When the comparator output signal $A_A$ or $A_B$ is a logic 1 and the directory parity error associated with the corresponding output signal is a logic 1, the cache control logic 40 interprets this condition as a miss and causes the read request control signal to be generated and coupled to the main memory (not shown). Simultaneous with the read request control signal the real address of the information to be read from main memory is coupled to the main memory, the real address being stored in the main memory address register 50.

When the comparator output signals $A_A$ or $A_B$ is a logic 1 indicating the data is stored in the corresponding level of the cache 30 and no directory parity error exists as result of reading the information stored in the directory, but a corresponding parity error exists as a result of the cache read, the cache control logic 40 interprets this condition as a miss condition, causing the read request control signal to be generated to main memory, and as a result, the block containing the data is refetched from the main memory without a system interruption. In the preferred embodiment of the present invention, the cache utilizes the "store through approach" rather than the "store into approach".

When the comparator output signals $A_A$ and $A_B$ are both a logic 1, the indication is that the desired computer word is in both level A and level B of cache 30. Because this condition should not occur, it is treated as an error independent of the directory parity and cache parity results. The read request control signal is generated and the desired information read from main memory.

In systems which utilize the "store into approach", data, which is updated by the CPU as a result of some operation, is stored into the cache only. Hence, the only place which has the "latest, up-to-date" information is the cache. At some predetermined time when some more recent data needs to be stored into cache, the information then currently stored in cache is transferred to main memory thereby updating main memory at that time. In systems utilizing the store into approach, when a cache parity error is detected, the program currently being executed is aborted, or if the operating system is executed when the parity error is detected on the information stored in cache the system is forced to "crash".

In the approach utilized by the preferred embodiment in which the present invention may be utilized as data is updated in cache, it is also updated in main memory thus there is an alternative source for the data if a parity error on the data in cache is detected. (This is what has been referred to above as the "store-through-approach".) In the system of the present invention, when a parity error is detected on the data read from cache (assuming no directory parity error exists) and the corresponding comparator output indicates the data is available in cache, the cache control logic 40 forces the logic to indicate that the directory had a mismatch and that the data was not stored in cache, thereby causing the CPU to refetch the data from main memory.

Although only two levels of cache (including the corresponding directory) are shown, it will be understood by those skilled in the art that the system of the present invention can include a single level, or multiple levels greater than two. Further, although parity checking is used to detect errors of the directory and cache reads, it will also be understood by those skilled in the art that other methods of error checking may be utilized.

While there has been shown what is considered the preferred embodiment of the present invention, it will be manifest that many changes and modifications can be made therein without departing from the essential spirit and scope of the invention. It is intended, therefore, in the appended claims to cover all such changes and modifications which fall within the true scope of the invention.

We claim:

1. In a data processing system, having a central processing unit (CPU) and a main memory for storing computer words, and wherein the CPU includes a cache unit, and wherein the CPU requests that a computer word be fetched, the computer word to be fetched being identified by a real address location corresponding to a location where the predetermined computer word is stored in main memory, the CPU request to fetch the computer word being coupled through the cache unit such that the cache unit first determines whether the computer word is stored within the cache unit, said cache unit comprising:
   (a) cable means for storing predetermined computer words;
   (b) directory means for storing partial real address information to a corresponding computer word stored in said cache means;
   (c) detecting means, operatively connected to said cache means and to said directory means, for determining when a hit occurs without any errors; and
   (d) control logic means, operatively connected to said detecting means, for making available to the CPU the requested computer word from the cache means or the main memory.

2. A cache unit according to claim 1, wherein said detecting means comprises:
   (a) comparator means, for comparing the real address information stored in a predetermined location of said directory means to the corresponding portion the read address information of the computer word currently being fetched; and
   (b) error checking means, for detecting any errors which occur in the process of obtaining information stored in said cache means and said directory means.

3. A cache unit according to claim 2 wherein said error checking means comprises:
   (a) parity checking logic; and
   (b) parity storage RAMS.

4. In a data processing system, having a central processing unit (CPU) and a main memory for storing computer words, and wherein the CPU includes a cache unit, and wherein the CPU requests that a computer word be fetched, the computer word to be fetched being identified by a real address location corresponding to a location where the predetermined computer word is stored in main memory, the CPU request to fetch the computer word being coupled through the cache unit such that the cache unit first determines whether the computer word is stored within the cache unit, said cache unit comprising:
   (a) cache means, having a plurality of levels, for storing predetermined computer words;
   (b) directory means, having a plurality of levels, the plurality corresponding to the plurality of said cache means, for storing partial real address information to a corresponding computer word stored in said cache means;
   (c) detecting means, operatively connected to said cache means and to said directory means, for determining when a hit in any one of the levels of said directory means occurs without any errors; and
   (d) control logic means, operatively connected to said detecting means, for making available to the CPU the requested computer word from the appropriate level of said cache means or the main memory.

5. A cache unit according to claim 4, wherein said detecting means comprises:
   (a) comparator means, for comparing the real address information stored in a predetermined location of each level of said directory means to the corresponding portion the read address information of the computer word currently being fetched; and
   (b) error checking means, for detecting any errors which occur in the process of obtaining information stored in each level of said cache means and said directory means.

* * * * *